(12) United States Patent
Brown et al.

(10) Patent No.: US 6,260,414 B1
(45) Date of Patent: Jul. 17, 2001

(54) LIQUID CRYSTAL LIQUID LEVEL INDICATOR

(75) Inventors: Keith Brown, Fort Lauderdale; Chester J. Currie, Wilton Manors, both of FL (US)

(73) Assignee: Jackson - Kie, Inc., Wilton Manors, FL (US)

( * ) Notice: Subject to any disclaimer, the term of this patent is extended or adjusted under 35 U.S.C. 154(b) by 0 days.

(21) Appl. No.: 09/176,790

(22) Filed: Oct. 22, 1998

(51) Int. Cl.[7] .................................................. G01F 23/22
(52) U.S. Cl. ............................................................ 73/295
(58) Field of Search ....................................... 73/295, 356

(56) References Cited

U.S. PATENT DOCUMENTS

| | | | |
|---|---|---|---|
| 3,696,675 | 10/1972 | Gilmour | 73/295 |
| 4,246,785 | * 1/1981 | Sellers et al. | 73/356 |
| 4,302,971 | * 12/1981 | Luk | 73/356 |
| 4,854,160 | * 8/1989 | Glatt | 73/336 |
| 5,323,652 | 6/1994 | Parker | 73/295 |
| 5,385,044 | 1/1995 | Thomas et al. | 73/295 |
| 5,686,153 | 11/1997 | Heynderickx et al. | 428/1 |
| 5,707,590 | * 1/1998 | Thomas et al. | 73/295 |
| 5,738,442 | 4/1998 | Paron et al. | 374/162 |
| 6,012,411 | * 1/2000 | Hochbrueckner | 73/49.2 |

* cited by examiner

Primary Examiner—Hezron Williams
Assistant Examiner—Katina M. Wilson
(74) Attorney, Agent, or Firm—David P. Lhota, Esq.; Stearns Weaver Miller Weisslar Alahadeff & Sitterson, P.A.

(57) ABSTRACT

A cholesteric liquid crystal fluid level indicator that determines the level of a cooled liquid, such as beer, in a closed, opaque keg when placed in thermal contact with the exterior surface of the keg, by producing a color change that is a function of the liquid temperature when the liquid is within a predetermined temperature range, the indicator comprises a multiple level strip having a top transparent layer, liquid crystal layer, a black background layer and an attachment layer employing a protected adhesive on its bottom surface for removably attaching the strip to the keg, the instant invention employs a heat conducting adhesive on the attachment layer and for securing certain layers in the strip, such as the liquid crystal layer.

20 Claims, 2 Drawing Sheets

LIQUID CRYSTAL LIQUID LEVEL INDICATOR

CROSS REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

This invention relates generally to a device for determining the level of a cooled liquid in a closed container, and more particularly, to a cholesteric liquid crystal fluid level indicator that determines the level of a cooled liquid, such as beer, in a keg when placed in thermal contact with the exterior surface of the keg by producing a color change that is a function of the liquid temperature when the liquid is within a predetermined temperature range. The invention also produces a predetermined color when the liquid is within a predetermined temperature range for visually ascertaining whether it is at its ideal temperature.

2. Description of the Background Art

In the bar and restaurant industry, an accurate inventory is paramount to maintaining the bottom line and anticipated profit margins. When food and drink inventory are lost, it eats into the company's profit. Accordingly, restaurant owners and operators employ strict inventory tracking methods for food, liquor and controllables. For instance, food consumption is measured by noting counts per unit or weighing the food product. Specific emphasis is placed on the amount of pounds and ounces being sold and lost. Inventory for controllables, such as paper goods (paper towels, toilet paper, napkins, etc.), condiments (ketchup, mustard, sugars, Sweet-n-Low®, sauces, etc.), glassware and miscellaneous items (straws, toothpicks, etc.) are also routinely counted. Liquor is accounted for by counting bottles and noting levels remaining in partially used bottles. In fact, most bar inventory methods count the bottles in tenths or quarters. This measuring technique is reasonably accurate since the liquor levels can be seen through the bottles. While accountable inventory measuring techniques exist for food, liquor and controllables, there is still no accurate, cost effective method or device for taking the inventory of draft beer in a closed keg.

Conventional techniques for taking inventory of draft beer are either inaccurate, unsafe, time consuming and/or too expensive. Draft beer is sold in opaque kegs. Therefore, beer levels can not be readily and accurately ascertained. Inventory for draft beer is primarily done by lifting and shaking the keg. Lifting and shaking kegs to determine the quantity remaining is highly subjective and inaccurate. It only provides an approximation of how much beer is left in the keg. Another method involves lifting and weighing the keg to determine the amount of beer remaining. Weighing the keg, while theoretically more accurate, requires a durable scale and additional information for converting weight to ounces. Neither method is convenient and both involve heavy lifting. As a full keg weighs approximately 160 pounds, there is a high risk of back injuries, muscle tears and hernias, associated with lifting, shaking and/or weighing kegs, even with a partially filled keg. An injured employee is inevitably lost for a period of time and a worker's compensation claim is invariably made, increasing the likelihood of increased insurance premiums. It is therefore desirable to have a device that measures keg fluid levels without requiring lifting, shaking or weighing. A device for readily measuring keg levels that avoids and solves the foregoing risks and problems would be well received.

Another problem experienced by restaurant and bar businesses is ascertaining whether beer in a keg is at its ideal temperature or at least within its required temperature range. The ideal temperature for beer varies. The ideal temperature for beer can range between 32° F. and 44° F. depending on the make and entity storing the beer. The ideal temperature for most beer is approximately thirty-eight degrees Fahrenheit (38° F.). Microbrews and foreign beers can have ideal temperatures between 38° F. and 42° F. And, some establishments store their beer at temperatures below 38° F. and as low as 32° F. Therefore, most coolers are operated within this temperature range to keep the beer at its ideal temperature. In fact, many local health ordinances require that coolers be operated within a specified range, such as 35° F. to 44° F.

Beer kegs are stored in coolers, typically along with other items that are needed more frequently. Therefore, the temperature in a cooler constantly fluctuates due to the refrigeration system efficiency and frequent opening of the door. If the cooler is not operating properly or is experiencing a high flow of traffic, it can warm the cooler several degrees. This increase in temperature is typically unnoticeable to the individual, but still affects the temperature of the beer. If the cooler is allowed to operate outside its temperature for extended periods of time it can cause the beer to age prematurely. Conversely, some coolers may be operated too low, such as around 33° F., to compensate for fluctuations in temperture. However, when traffic slows down for a period of time the beer can drop below its ideal temperature. If a device was ecomically available for monitoring the temperature of beer in a keg, the cooler could be adjusted to ensure that the beer is maintained at or near its ideal temperature. In fact, a beer level measuring device for kegs that also insures proper beer temperature would be well received by the industry.

Several devices are known in the background art for measuring propane levels in gas tanks. Other devices are known for measuring the temperature of liquids, such as wine. However, none of these devices are adapted for or capable of measuring the level of beer or other fluids in a closed keg or for indicating whether beer is at its ideal temperature, as contemplated by the instant invention. One known device comprises an electronic sonar device. This device is costly and outside the scope of the instant invention. Other devices known employ thermotropic or thermochromic liquid crystal technology for measuring gas levels in closed tanks, such as propane tanks. This technology has primarily been applied to flow visualization and heat transfer research. More recently, thermochromic liquid crystal technology has been used for thermometer strips, such as forehead thermometers, and propane tank gas measurement devices. These devices, however, are not designed for reacting to temperatures within the temperature range in which conventional coolers and walk-in refrigerators are operated, i.e. between 32° F. and 44° F. Such a device would facilitate convenient monitoring of a keg's beer level and indicate whether the beer is below, above or at its ideal temperature.

The most common thermochromic liquid crystal known to be employed with measuring gas in closed tanks is the cholesteric liquid crystal. Cholesteric liquid crystals are chemical compounds and mixtures which exhibit the mechanical properties of liquids but have the optical properties of crystals. Cholesteric liquid crystals are optically active mixtures of organic materials which produce color changes in reaction to fluctuations in temperature in a temperature range which is a function of the particular compound selected. Depending on the compound selected, changes from red to violet can occur in a range of +20° C. to 250° C. Known gas level monitoring devices are only designed to react to temperatures above 59° F. The liquid crystal composition in theses devices can not react to exhibit colors between 30° F. and 50° F.

Cholesteric liquid crystals show color by selectively reflecting incident white light. In response to temperature differentials, conventional cholesteric liquid crystals change colors across the visible spectrum, beginning at colorless and going through red, orange/yellow (tan or brown), green, blue, violet and colorless again. Liquid crystal mixtures and products typically have a red start/transition temperature at one end of the bandwidth, a green mid-section and a blue start/transition temperature at the other end of the bandwidth. The bandwidth is determined by the difference between the red start temperature and the blue start temperature. The background art known for measuring gas in a tank comprises liquid crystal strips designed for bandwidths in higher temperatures that can not be triggered by the cooler temperatures needed for producing a color change for liquids in the 30° F. to 50° F. range. While thermometers exist for reading the temperature of wine and refrigerators, they are not adapted for attachment to a keg or for use in reading the level of beer in a keg. Liquid crystal thermometers only give one reading. These thermometers are also outside the temperature range for cooled kegs of beer and are not capable of reading the level of beer in a closed keg. Moreover, the liquid crystal technology employed in the background art requires that a temperature differential be induced on the article being tested by either heating or cooling the liquid crystal strip.

As currently employed for propane tanks, cholesteric liquid crystals and other thermochromic liquid crystals are designed for working in the 15° C. to 50° C. (59° F. to 122° F.) range. In fact, several patents have issued for devices adapted to tighter tolerances within this range or to different transition temperatures within this range. These devices fail to contemplate or address the indication of beer level in kegs and ideal temperatures. In addition, these known patents require that the strips containing the liquid crystals be heated or cooled to create a temperature differential. For instance, U.S. Pat. No. 3,696,675, issued to Gilmour, discloses a method and means for determining liquid level in a container comprising an elongated strip of material coated or imbedded with cholesteric liquid crystals which exhibit color changes with changes in temperature. The term liquid is used loosely in Gilnour. Gilmour is specifically designed for propane gas and thus operates in the mesomorphic range between 59° F. and 122° F. Gilmour also requires a temperature change to be induced on the exterior surface wall of the container by applying heated or chilled water or utilizing an electrical heating element. Parker, in U.S. Pat. No. 5,323,652, discloses a thermochromic level indicator comprising a temperature responsive strip including at least two thermochromic materials of different opacities and transition temperatures which produce a color in the 80.6° F. to 95° F. temperature range. Parker is also designed for measuring gas levels in propane tanks and requires that an external temperature source, such as hot water, an electrical heating element or a pair of leads carrying a current, be applied to the strip. Thomas et al., in U.S. Pat. No. 5,385,044, discloses a method of using a thermochromatic detergent level indicator for determining the level of solid detergent contents in an opaque, plastic container. Thomas et al. is specifically designed for solid detergents and uses a thermochromatic substance which has a temperature activity point ranging from 100° F. to 180° F. and requires an external water spray having a temperature of 120° F. Heynderickx et al., in U.S. Pat. No. 5,686,153, discloses an optical temperature indicator comprising an optically active layer of a transparent polymeric material in which liquid-crystaline material is dispersed and has a polymeric structure which is based on siloxane. Heynderickx et al. is specifically designed for high temperatures, i.e. temperatures above 174° F., for use with irons, coffee makers, hairdriers, elecrtrical cookers, ovens and deep-fat fryers. The Heynderickx et al. strip is blue below 174° F. and red above this temperature. Paron et al. discloses a wine thermometer for adhesive application to wine bottles to determine wine temperature therein. The Paron et al. thermometer has a plurality of different liquid crystal compositions that make up a temperature panel that operates in the 40° F. to 66° F. range and has a temperature scale adjacent the panel. Similar to conventional thermometers, Paron et al. has a plurlaity of temperature levels and each level comprises a different liquid crystal composition for measuring different temperatures across the thermometer. Like the other above noted patents, Paron et al. requires an external temperature source, such as hot or cold water, to activate the liquid crystal strip thermometer. In addition, Paron et al. comprises a thermometer that only measures temperatures above the temperature range for cooled beer kegs.

The above noted art fails to teach or suggest a thermochromic liquid crystal strip that can measure the level of beer in a cooled keg. The above noted art is not operable within the 30° F. to 50° F. temperature range or adapted for use in reading beer level in a keg, and requires an external temperature source, such as hot or cold water or an electrical heating element, to work. There is no device currently known that measures the level of cooled liquids in a closed container and/or indicates whether the liquid is at its ideal temperature. Consequently, there exist a need for such a device. The instant invention specifically addresses this gap in the prior art by providing a thermochromic liquid crystal strip having a liquid crystal composition that produces color change somewhere in the 30° F. to 50° F. temperature range. This range is consistent with the temperature of beer so that the level of beer may be readily determined by observing the color change of the strip. In addition, the instant invention produces a predetermined color when the beer is at its ideal temperature to indicate the same.

BRIEF SUMMARY OF THE INVENTION

In light of the foregoing, it is an object of the present invention to provide a thermochromic liquid crystal product and liquid crystal strip that operates in a specified temperature range not previously contemplated by the prior art.

It is also an object of the present invention to provide a thermochromic liquid crystal liquid level indicator that indicates the level of beer in a keg by producing a color change consistent therewith.

It is another object of the instant invention to provide a thermochromic liquid crystal liquid level indicator that produces at least one predetermined color adjacent the liquid portion of the keg volume and a different color adjacent the gas portion of the keg.

It is an additional object of the instant invention to provide a thermochromic liquid crystal liquid level indicator that indicates the level of beer in a keg by producing a color change consistent therewith without the aid of any external temperature source having to be applied directly thereto.

It is a further object of the instant invention to provide a thermochromic liquid crystal liquid level indicator that indicates whether the beer is at its ideal temperature by producing a predetermined color consistent therewith.

It is yet another object of the instant invention to provide a thermochromic liquid crystal indicator that may be directly applied to the exterior surface of the keg with an adhesive that does not adversely affect the operation thereof.

It is yet a further object of the instant invention to provide a thermochromic liquid crystal liquid level indicator that operates in at least a portion of the temperature range between 30° F. and 50° F.

It is yet an additional object of the instant invention to provide a thermochromic liquid crystal liquid level indicator that is conveniently available in ready to use strips.

It is still another object of the instant invention to provide a thermochromic liquid crystal liquid level indicator that is conveniently available in rolls that may be converted to ready to use strips.

It is still an additional object of the instant invention to provide a thermochromic liquid crystal liquid level indicator that is cost effective and convenient to manufacture with known manufacturing techniques.

It is still a further object of the instant invention to provide a thermochromic liquid crystal liquid level indicator that is reusable.

It is another object of the instant invention to provided a thermochromic liquid crystal liquid level indicator that comprises a permanent component of the keg.

In light of these and other objects, the instant invention comprises a thermochromic liquid crystal liquid level indicator adapted for use on closed, opaque and cooled containers, such as beer kegs, containing a liquid (such as beer) and a gas (such as $CO_2$, Nitrous or blends thereof). The inventive thermochromic liquid crystal liquid level indicator indicates the level of the liquid therein and whether the liquid is at its ideal temperature. Conventional kegs use $CO_2$ and are stored in cooled environments, such as walk-in coolers, that are typically maintained at temperatures between 32° F. and 44° F. The temperature in coolers and refrigerators constantly fluctuates causing the keg portion in contact with the gas to fluctuate therewith. Meanwhile, the liquid remains substantially stable at its temperature and hence the portion of the keg in contact with the liquid remains at the temperature of the liquid. Since liquid has more mass and density than gas, liquid holds its temperature longer and requires substantial heat transfer to noticeably change temperature. Therefore, the temperature of the keg wall adjacent the liquid remains stable. By contrast, gas lacks sufficient mass for maintaining its temperature, so the keg wall adjacent the gas absorbs heat and changes temperature more readily. The cooled liquid keeps the corresponding portion of the keg cool while the keg portion adjacent the gas warms in response to the heat introduced into the cooler. The liquid crystal strip of the instant invention is designed to detect and react to the different temperatures along the keg wall by exhibiting one color along the keg adjacent the liquid and a different color adjacent the gas. The point at which the strip changes color indicates the level of liquid in the keg.

The instant invention employs a thermochromic liquid crystal composition that is coated and/or printed onto a supporting substrate to form the liquid crystal layer. The liquid crystal composition operates within at least a portion of the 30° F. to 50° F. temperature range. It is designed to take advantage of the temperature differential along the section of the keg holding liquid and the section holding gas, as well as the stability of liquid temperature in closed containers, namely beer kegs stored in cooled environments. The thernochromic liquid crystal liquid level indicator of the instant invention reacts to changes in the keg wall temperature adjacent the gas by exhibiting one color along the strip adjacent the gas and a different color adjacent the liquid portion of the keg, thus allowing one to determine the level of liquid in the container. The color of the strip adjacent the liquid remains constant, so long as the liquid temperature remains constant, and exhibits a predetermined color that indicates whether the beer is at its ideal temperature. The preferred color for indicating ideal beer temperature is tan, brown, green, or some other color on the visible color spectrum between red and green.

The liquid crystal liquid level indicator generally comprises an elongated, multi-level strip having a layer coated or imbedded with a thermochromic liquid crystal composition that is adapted for use in cooled environments and detects natural temperature fluctuations in this environment. The preferred embodiment of the liquid level indicator of the instant invention comprises a cholesteric liquid crystal layer as manufactured by Hallcrest, Inc. of Glenview, Ill. in accordance with the specifications herein. The preferred strip employs a continuous thermochromic liquid crystal layer format extending substantially between the top and bottom of the strip. The thermochromic liquid crystal layer may also comprise a plurality of liquid crystal patches, each of the same liquid crystal composition, disposed longitudinally between the top and bottom of the strip. The strip produces a gradient of colors. The strip changes colors from black to red, tan/brown, green and blue, and transition colors therebetween, depending on the detected temperature. The liquid crystal composition employed by the instant invention exhibits color in response to temperature changes, occurring in the kegs environment, within the bandwidth of the liquid crystal composition. The preferred bandwidth is somewhere between 30° F. and 50° F. and is ideally set from 34° F. to 44° F. or 32° F. to 44° F. The bandwidth may be tighter, such as 36° to 42° F., for optimal operation with the majority of applications, since most beer has an ideal temperature of 38° F. A tighter bandwidth provides a faster reaction time and therefore may be preferred. Alternatively, the bandwidth may be increased for proper operation in coolers that are operated outside the preferred temperature range. The strip preferably includes a cholesteric liquid crystal composition that reacts to temperature changes occurring on and in the medium to which it is attached, or in thermal contact with, and exhibits colors, from a gradient of colors, directly proportional to the temperature of the keg.

The thermochromic liquid crystal preferably comprises a cholesteric liquid crystal composition or cholesteric/chiral nematic liquid crystal mixture that exhibits at least one color, but preferably three, in a predetermined cooled temperature range. The preferred embodiment of the inventive strip has a unique thermochromic liquid crystal composition that operates within a predetermined region in the 30° F. to 50° F. temperature range. It is known that liquid crystals change colors across the visible spectrum in response to temperature changes. The prior art requires the creation of a temperature differential between the strip and medium being mesasured by heating or cooling the strip with an external source. The preferred thermochromic liquid crystal composition of the instant invention is unique in that it reacts to natural temperature changes that occur in a cooled environment, such as a walk-in refrigerator. Consequently, the inventive strip does not require the direct application of an external temperature changing source, such as hot water, cooled water, electrical heating elements or electrical current.

The strip preferably appears colorless (or black because of the black background) below and above the preferred temperature range (32° F. or 34° F. to 44° F.) and exhibits either red, tan/brown, green, blue or colors therebetween within the temperature range, depending on the actual temperature of the liquid enclosed in the container or keg. The strip may alternatively exhibit just red, green or blue. Most importantly, the strip exhibits a different color adjacent the liquid portion of the keg than that exhibited adjacent the gas portion. As noted herein, the strip and thermochromic liquid crystal composition contained therein, or thereon, is designed for use with kegs of beer to determine the level of beer within the keg and to indicate whether the beer is at its ideal temperature, which is approximately 38° F. for most applications.

The liquid crystal layer is preferably sealed between a transparent substrate and a supporting substrate. The strip preferably comprises a top optically transparent layer, a thermochromic liquid crystal layer, a black or dark background, an attachment layer, such as an adhesive adapted for attachment to a cooled-metallic surface, and an adhesive protection layer. The layers of the strip are preferably attached together by adhesives, heat stamping or other known devices in the art, to form a permanent or non-permanent composite strip. The layers preferably remain attached together in temperatures above 29° F. The adhesive employed preferably conducts heat and/or does not adversely affect the operation of the liquid crystals. Alternatively, the layers of the strip may not remain permanently attached to each other. In one alternative, the attachment layer could comprise an independent layer that fits over the strip and holds it against the keg.

The top transparent layer preferably comprises a transparent polymer substrate that may also have properties of an ultraviolet light filter to protect the liquid crystal layer from UV damage. The liquid crystal layer preferably comprises a thin film or coated ink of a cholesteric liquid crystal composition or other liquid crystal formulation meeting the specifications of the instant invention. The liquid crystal composition is applied to a supporting substrate using known printing, coating or imbedding techniques. It should be noted that the instant invention may incorporate any thermochromic liquid crystal composition, including but not limited to cholesteric, chiral nematic or combinations thereof, that exhibits different colors in response to temperature changes and exhibits predetermined colors in response to temperatures sensed between 30° F. and 50° F. or tighter ranges therein. The liquid crystal layer is sandwiched between the top transparent layer and a black/dark absorbing background. The black absorbing background preferably comprises a black ink applied on the top of the dried thermochromic liquid crystal coating such that color changes are viewed from the reverse, uncoated side of the sheet. The black background may alternatively comprise a lower surface of the liquid crystal layer, a separate blackened polymer sheet/layer, positioned below or above the liquid crystal layer, or the top surface of the attachment layer. The black background may be colored black by inking, painting, printing or other known methods and devices in the art. The liquid crystal layer may be adhered to the top transparent layer, attachment layer and/or black background layer (if it comprises a separate, distinct layer) using a heat conductive adhesive. In an alternative embodiment, a preselected indicia, such as a company logo or level markings, may be printed, inked or embossed on the strip below or directly on the top transparent layer so that it is visible with the naked eye.

The strip is preferably releasably attachable to a cooled keg by an attachment layer. The attachment layer preferably comprises a modified acrylic adhesive with a polyester carrier, a polymer, a mylar or polyester mylar substrate with at least one adhesive surface or other known substrate having at least one adhesive surface. The attachment layer may comprise an adhesive applied to the non-viewing surface of the liquid crystal layer or a separate layer as described above. The attachment layer adhesive adheres to a cooled keg and may be removed when the keg is empty for use on other kegs. In the preferred embodiment, the adhesive surface of the attachment layer is covered and protected by a thin, press sensitive, removable moisture stable release paper, such as waxed paper or other known non-permanent adhering paper. In another embodiment, the attachment layer may comprise an individual or separate layer that lays over the entire strip and statically, or by surface tension, adheres to the keg, sandwiching the strip therebetween. This would make it easier to reuse the strip without having to worry about an adhesive surface. Alternatively, the adhesive employed in the preferred embodiment may permanently adhere to the keg. In another alternative embodiment, the attachment layer may comprise a magnet or magnetized substrate.

To use the instant invention, the release paper is pealed or otherwise removed from the adhesive surface of the attachment layer. The strip is then adhered to the exterior surface of the keg in a substantially vertical position between the top and bottom ends of the keg. As beer would prematurely age at room temperature, kegs of beer are invariably stored in refrigerated coolers that are maintained somewhere between 30° F. to 50° F. The cooler may comprise a walk-in cooler where kegs are stored prior to use, or the cooler where the keg is kept during use. When attached to the exterior surface of the keg, the strip almost always exhibits one color adjacent the portion of the keg having beer and a different color adjacent the portion of the keg having gas, thus providing an indication of the beer level. The inventive strip, as designed, reacts differently to the temperature of the keg wall adjacent the liquid than it does to the portion adjacent the gas, as soon as heat is introduced into the cooler, such as by opening the door. This is because the temperature of the keg wall in contact with the liquid remains at the temperature of the liquid, while the temperature of the keg portion in contact with the gas begins to warm instantly with the introduction of heat. The temperature of the keg wall between the liquid and gas portions typically vary up to 6° F. The liquid crystal composition produces a color adjacent the beer portion of the keg that is consistent with or directly related to the temperature of the beer and a different color adjacent the gas portion of the keg. If the beer is at or substantially near its ideal temperature (e.g. 38° F., if this is the ideal temperature), the strip exhibits a predetermined color, preferably tan/brown, green or a hybrid thereof. If the beer is within the strip's operative temperature range but below the ideal temperature range, then the strip exhibits another color, such as red. If the beer is within the strip's temperature range but above the ideal temperature range, then the strip exhibits a third color, such as blueish-green or blue. The strip section adjacent the gas portion of the keg invariably produces a different color than that adjacent the beer, because the temperature of the keg wall above the beer level fluctuates and is thus different than the beer temperature. The entire strip appears black when the beer is outside the strip's temperature bandwidth or when there is no beer remaining in the keg. As thermochromic liquid crystals exhibit colors in response to changes in temperature, the liquid crystals in the inventive strip comprise a composition and makeup that is sensitive to slight fluctuations in temperature within the refrigerated cooler and the keg wall. These temperature fluctuations are caused by the cycling of the cooler motor and the opening and closing of the cooler door. The instant invention discovered a way to take advantage of these cooler temperature fluctuations to activate the liquid crystals without relying on the application of external sources, such as hot water and heating elements.

DETAILED DESCRIPTION OF THE INVENTION

Figure 1:
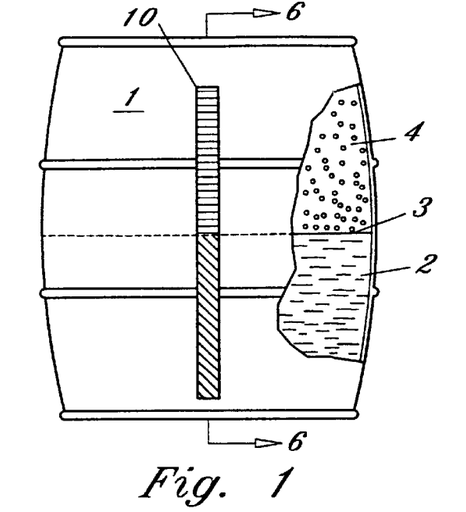
FIG. 1 is a front elevational and partial cut-away view of the preferred embodiment of the liquid crystal liquid level indicator of the instant invention as used on a keg of beer, illustrating the liquid level through the cut-away portion of the keg.
Figure 2:
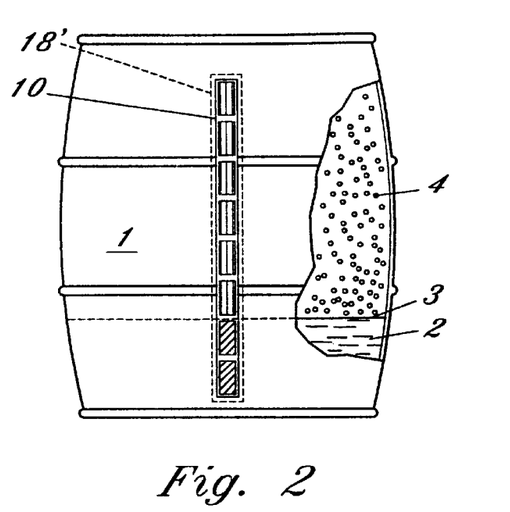
FIG. 2 is a front elevational and partial cut-away view of an alternative embodiment of the liquid crystal liquid level indicator of the instant invention as used on a keg of beer, illustrating the liquid level through the cut-away portion of the keg.

With reference to the drawings, FIGS. 1 and 3–6 depict the preferred embodiment of the liquid crystal liquid level indicator strip (hereinafter "liquid level indicator strip" or "strip") of the instant invention, which is generally referenced by numeric character 10. FIG. 2 depicts an alternative embodiment of the liquid crystal liquid level indicator of the instant invention, which is also referenced by numeric character 10. The only difference between the strips shown in FIGS. 1 and 2 is the continuity of the strips. The preferred strip 10 shown in FIG. 1 comprises a continuous liquid crystal layer, from top to bottom. The alternative strip 10 shown in FIG. 2 comprises a plurality of liquid crystal sections stacked in vertical orientation, preferably on a common supporting layer. The liquid crystal composition and remaining layers remain consistent between the preferred and alternative embodiments of the instant invention. Accordingly, the description of this invention applies to both embodiments with the above noted caveat.

With reference to FIGS. 1 and 2, the strip 10 is elongated and is preferably sized to fit just below the top of a keg 1 and just above the bottom of the keg 1. Accordingly, the strip 10 is greater than twelve (12) inches long and less than twenty-four (24) inches. The strip 10 is preferably eighteen (18) inches. For ease of packaging and for keeping manufacturing costs down, the strip 10 is approximately less than two inches wide, and preferably between half an inch and one inch. These dimensions may vary without departing from the scope and spirit of the instant invention. The strip 10 comprises multiple layers that cooperate to achieve the objects of the instant invention. The strip 10 comprises at least a top optically transparent layer 12, a thermochromic liquid crystal layer 14 against a black background 16 and a bottom or attachment layer 20, preferably comprising an adhesive back surface for adhering to the keg 1 and having a removable adhesive protection layer 18. The top transparent layer 12 is attached to the liquid crystal surface of the liquid crystal layer 14 using an adhesive that conducts heat and/or does not adversely affect the operation of the liquid crystals. The liquid crystal layer 14 may include the black background and an adhesive backing as the attachment layer, thus obviating the need for a separate black background layer and a separate attachment layer. In the preferred embodiment, the liquid crystal layer 14 is at least adhered to a polymer or polyester mylar support or attachment layer 18 using a heat conductive adhesive. The support/attachment layer 18 preferably comprises an adhesive backing but may comprise a magnetic backing in an alternative embodiment. In another embodiment, the attachment layer 18 is replaced by an attachment layer 18' that covers the strip 10 and attaches to the keg 1 by static charge, surface tension or adhesion.

Figure 4:
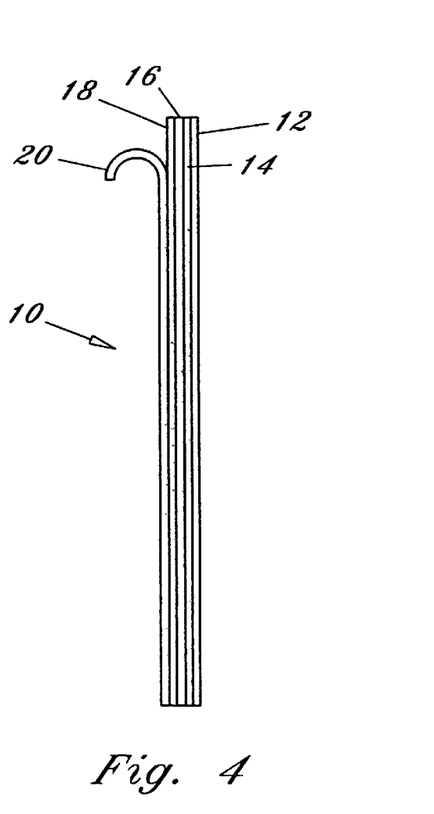
FIG. 4 is an enlarged side elevational view of the preferred embodiment of the liquid crystal liquid level indicator of the instant invention.
Figure 5:
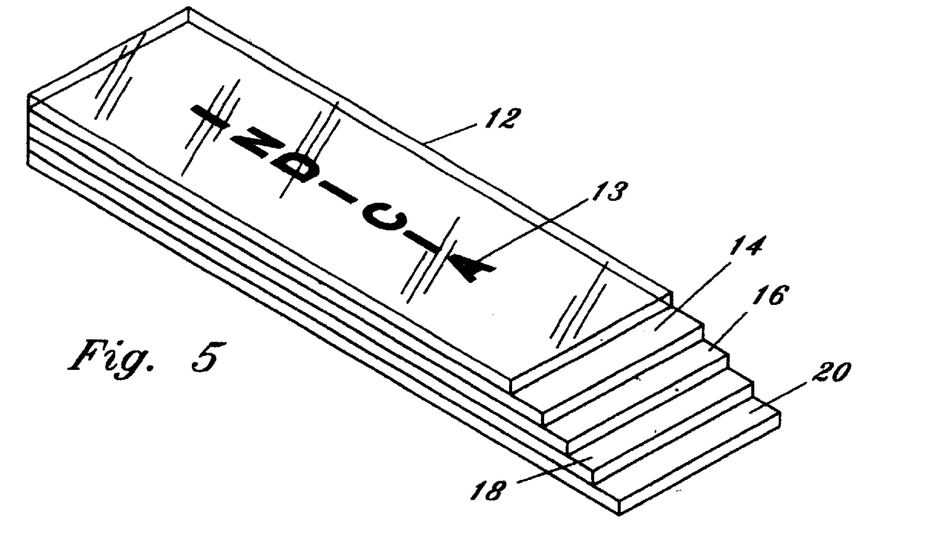
FIG. 5 is a top perspective, partially tiered view of the preferred embodiment of the liquid crystal liquid level indicator of the instant invention, further illustrating the option of adding indicia directly below the top protective, transparent layer.
Figure 6:
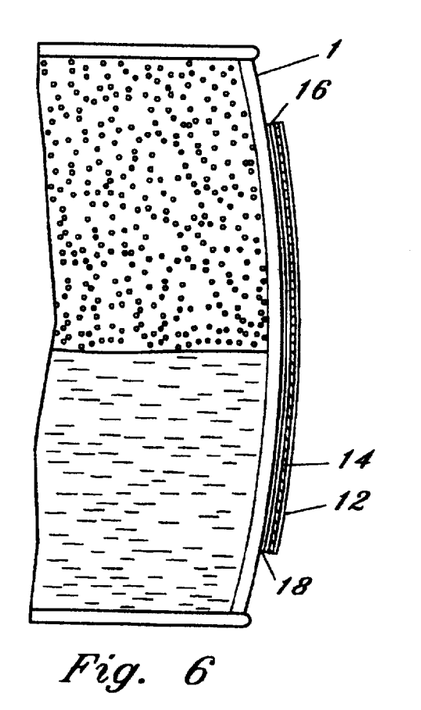
FIG. 6 is a partial side cross-sectional view, taken along cross-section line 6—6 of FIG. 1, of preferred embodiment of the liquid crystal liquid level indicator of the instant invention as used on a keg of beer, illustrating the liquid level through the cut-away portion of the keg.

With reference to FIGS. 4–6, the liquid level indicator strip 10 comprises a top optically transparent layer 12, a thermochromic liquid crystal layer 14, a black or dark background 16, an attachment layer 18, and an attachment surface protection layer 20. The strip 10 may also include indicia 13 displayed on or directly below the top transparent layer 12. The indicia 13 may be inked, printed, embossed or stamped on either surface of the top layer 12 or on its an individual layer. The indicia 13 could display a logo, company name, instructions, or other useful information. The indicia 13 is an alternative element of the instant invention. The layers of the strip 10 may be permanently or non-permanently attached together by adhesives, heat stamping or other known devices and methods in the art.

The top layer 12 preferably comprises a thin transparent polymer or mylar substrate. The top transparent layer 12 may include or comprise ultraviolet light filtering properties to protect the liquid crystal layer from UV damage. In the preferred embodiment, the UV filtering may not be necessary. While the protection of the liquid crystal layer 14 is important, the strip's 10 exposure to UV light is limited since the strip 10 is primarily adapted for use on kegs 1 and is removable and reusable. As kegs 1 are typically stored in dimly lit refrigerated coolers, the exposure to UV light is minimal. Nonetheless, UV filter characteristics may be necessary for those applications having extended exposure to UV light. For instance, in an alternative embodiment, the strip 10 is permanently attached to the keg 1. As empty kegs 1 are more susceptible to longer exposure to sunlight, this alternative embodiment preferably employs a transparent top layer 12 having UV filtering capabilities. Notwithstanding the foregoing, the top layer 12 must be transparent for exhibiting the colors produced by the liquid crystal layer 14. The top layer 12 should also be flexible, yet durable enough for assisting in the stability and structural reliability of the inventive strip 10. The bottom surface of the top transparent layer 12 may be attached to the color producing surface of the thermochromic liquid crystal layer 14 by a heat conducting adhesive or other safe adhesive, static charge, surface tension or devices and methods already known in the art. The method and device used for attaching the top layer 12 to the strip 10 is dependent on the proper operation of the liquid crystal layer 14, the desired stability and whether the attachment is to be permanent. For non-permanent attachment, a non-permanent adhesive, distinct attachment layer 18', static charge or surface tension techniques may be employed. For permanent attachment, a more permanent adhesive may be employed.

Figure 3:
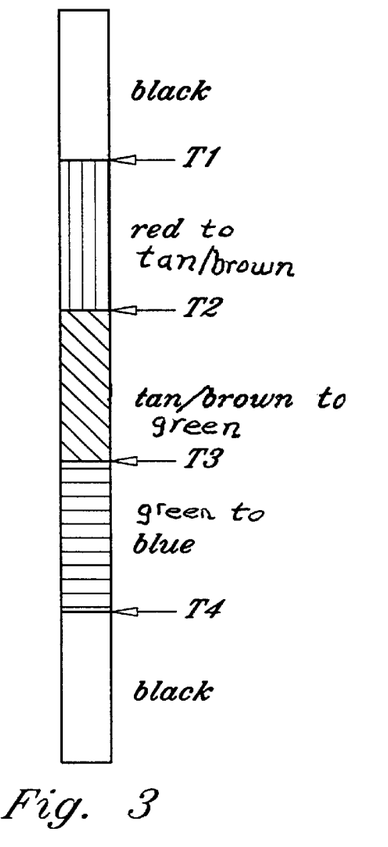
FIG. 3 is an illustrative view of the preferred colors which are produced within predetermined temperature ranges that comprise the preferred overall operative temperature range and further indicates the blackness of the strip outside the preferred overall temperature range.

The thermochromic liquid crystal layer 14 preferably comprises a thin film or coat of a cholesteric liquid crystal composition, or other liquid crystal formulation meeting the specifications herein, coated or inked on a supporting polymer or polyester mylar substrate, or other suitable substrate, using a known printing method. The black background layer 16, may comprise part of the liquid crystal layer whereby it is applied on top of the dry thermochromic liquid crystal coating such that color changes are viewable from the reverse/uncoated side of the liquid crystal layer 14. The liquid crystal layer 14 may also include the attachment layer 18, which comprises an adhesive applied to the back side of the layer 14 to facilitate adhesion to the keg 1. It should be noted that the instant invention may incorporate any thermochromic liquid crystal composition, including but not limited to cholesteric, chiral nematic or combinations thereof, that reacts to temperature changes or heat transfer and exhibits a color in response to liquid temperatures somewhere between 30° F. and 50° F. The thermochromic liquid crystal employed is preferably derived from sterols but may also be derived from non-sterols or combinations of sterols and non-sterols, without departing from the scope and spirit of the instant invention, so long as it is operative within the disclosed temperature range. The thermochromic liquid crystal composition employed on layer 14 preferably exhibits predetermined colors between 32° F. to 44° F., and is colorless (such that it appears black) below and above this range. With reference to FIG. 3, the preferred temperature ranges and colors are shown, whereby T1, T2, T3 and T4 represent the liquid crystal color transition temperatures. The difference between T1 and T4 comprises the preferred bandwidth. The tighter the bandwidth then the faster the reaction time of the liquid crystal layer 14. However, a bandwidth that is too tight will not provide sufficient latitude for capturing kegs stored in coolers outside the bandwidth.

Research has shown that most coolers are operated between 32° F. and 44° F. In the preferred embodiment, T1 may be any temperature between 32 and 36° F. and T4 may be any temperature between 43° F. and 50° F. T1 and T4 may vary within the 30° F. and 50° F. temperature range, and T4 may be as high as 60° F., for operation in cooresponding coolers without departing from the scope and spirit of the invention. Within the bandwidth, the inventive strip 10 preferably exhibits three colors and blends of those colors. Within T1 and T2, the liquid crystals in layer 14 preferably exhibit red and show that the beer/liquid is cooler than the ideal temperature. As the temperature approaches T2 it starts to turn from red, to tan/brown as the liquid crystal composition experiences temperatures approaching green. The ideal temperature is preferably around T2, or between T1 and T2, and exhibits tan/brown. T2 is preferably somewhere within 35° F. and 38° F., depending on the bandwidth selected, and providing T2 is greater than T1. Between T2 and T3, the liquid crystals exhibit shades of green indicating that the beer/liquid is starting to exceed its ideal temperature. T3 is preferably between 38° F. and 49° F. Between T3 and T4 the liquid crystals preferably begin to exhibit shades of blue, representing that the beer/liquid is warmer than its ideal temperature. The preferred temperatures and color are below blue and T3 since blue can experience tailing beyond the upper end of the bandwidth. T4 is preferably 44° F. but may be between 38° F. and 50° F. These colors may vary without departing from the scope and spirit of the instant invention for each temperature range. For instance, green could represent the ideal temperature or blue could represent cooler temperatures and red could represent warmer temperatures. T1, T2, T3 and T4 may vary without departing from the scope and spirit of the instant invention so long as different colors are shown for different temperatures.

Three formulations have been found to accommodate the three basic temperature ranges for ideal beer and determining beer level. In the first temperature formulation, T1 is 34° F., T2 is 35° F., T3 is 38° F. and T4 is 45° F. These temperature ranges and intermediate bandwidths accommodate beers that are stored in coolers below the conventional ideal temperature. In this first formulation, the ideal temperature is between 34° F. and 35° F. In the second formulation, T1 is 34° F., T2 is 38° F., T3 is 49° F. and T4 is 50° F., or greater. These temperature ranges and intermediate bandwidths accommodate beers that are stored in coolers near the conventional ideal temperature. In this second formulation, the ideal temperature is between 34° F. and 38° F. In some applications T4 may be as high as 65° F. to compensate for blue tailing. In the third formulation, T1 is 36° F., T2 is 38° F., T3 is 43° F. and T4 is 50° F., or greater, such as 60° to compensate for blue tailing. In this third formulation, the ideal temperature is between 36° F. and 38° F.

The thermochromic liquid crystal composition employed by the instant invention is designed for use in a cooled, closed refrigerated environment. The liquid crystal layer 14 of the instant invention is designed to react to slight and sudden changes in temperature, such as when a cooler door is opened or the compressor turns off, and produces a color specific to the temperature detected. The liquid crystal layer 14 exhibits a color along the strip 10 that is consistent with the temperature of the keg wall and the contents adjacent thereto. As an example, if the beer 2 (keg wall adjacent thereto) is within T2 and T3 and the keg wall adjacent the gas 4 is greater than T3, then the liquid crystals exhibit tan/brown or green along the strip 10 adjacent the beer 2 and blue-green or blue adjacent the gas 4, as shown in FIG. 3. If the beer 2 is within T2 and T3 and the keg wall adjacent the gas 4 is less than T2, then the liquid crystals exhibit green, blue or green-blue along the strip 10 adjacent the beer 2 and red or black adjacent the gas 4. In both the foregoing examples, the gas portion of the strip and the beer portion of the strip exhibit different colors. The beer level 3 is reflected by the common point between the two colors. To complete the description, if the contents of the keg 1 are less than T1 or more than T4, then the strip 10 exhibits black because the liquid crystal composition remains colorless. It is important to note that the colors and temperature ranges may vary, but that the invention shows different colors adjacent the beer than it does adjacent the gas.

The strip 10 is preferably analog but may also comprise digital. The analog version of the strip 10 shows a continuous format, whereby temperatures may be indicated by a bright line or section which moves continuously throughout the strip's 10 temperature range. If the contents of the keg 1 are at or between the transition temperatures, then the color exhibited may comprise a blend of colors. For instance, if the beer 2 is at T2, then the strip 10 may show red and tan/brown and possibly a blend of the two colors. This blend does not affect the ability to read the beer level 3. The digital version of the strip 10 is comprised of a series of liquid crystal formulations called events. Each event is precisely calibrated to show a predetermined color, such as tan between T2 and T3, changing color in sequence from tan to green to blue as the temperature increases and from tan to red if the temperature decreases. The digital form only shows one color for each event.

Although the gas 4 and liquid/beer 2 in the keg 1 could momentarily be at the same temperature, the liquid crystal composition on layer 14 reacts to sudden changes in temperature, such as when the cooler door is opened or the compressor turns off, and therefore produces a different color adjacent the beer and gas. This is because the keg 1 wall is at a different temperature along the portion adjacent the beer 2 than along the portion adjacent the gas 4. The temperature of the liquid/beer 2 and keg wall adjacent thereto remains stable while the temperature of the keg wall adjacent the gas 4 varies with changes in temperature occurring in the cooler. The cooled liquid portion of the keg 1 keeps that portion of the keg wall cool, whereas the portion of the keg 1 adjacent the gas 4 does not. The changes in temperature occur in a closed, cooled environment when heat is suddenly introduced, such as by opening a door to ambient or the automatic cycling of the compressor. The invention works on the thermodynamic principle that liquid and gas have different masses and heat transfer coefficients and thus experience different rates of heat transfer and require different amounts of heat to experience a noticeable temperature change. Therefore, liquid requires more heat to experience a noticeable change in temperature. When the refrigerator door is opened and/or the cooler compressor switches between on and off, the temperature in the cooler suddenly changes because heat is introduced. The instant invention takes advantage of the fact that the keg wall has different temperatures adjacent the liquid and gas, because of the differences in thermal response to heat transfer. As liquid crystal technology reacts to changes in temperature, the inventive strip 10 produces readings based on this difference in temperature between gas and liquid and occurring along the keg, and thus exhibits different colors adjacent the gas 4 and beer 2. Consequently, the instant invention 10 produces a different color adjacent the beer 2 portion of the keg 1 compared to the gas portion 4 of the keg 1, such that the level 3 may be readily ascertained.

The liquid crystal strip 14 is sandwiched between the top transparent layer 12 and a black/dark absorbing background 16. The black/dark background layer 16 preferably comprises a black ink applied on top of the surface of the liquid crystal layer 14 containing the dried liquid crystal composition. Thus, the color changes are viewable from the reverse side of the liquid crystal layer. Alternatively, the black absorbing background 16 may comprise a separate, blackened, flexible polymer sheet/layer or the top surface of the attachment layer 18, colored black by inking, painting, printing or other known methods and devices in the art. If the blackened layer 16 comprises a separate sheet then it could be permanently or non-permanently attached to the top surface of the attachment layer 18 or the liquid crystal surface of the liquid crystal layer 14. The liquid crystal layer 14 may be adhered to the black background layer 16 or the blackened attachment layer 18 using a heat conductive adhesive. The black background layer 16 absorbs any light transmitted through the liquid crystal coating and allows color to be observed without light interference.

The attachment layer 18 may comprises an adhesive coating applied to the blackened surface, or back surface, of the liquid crystal layer 14 to facilitate adhesion to the keg 1 surface. The attachment layer 18 preferably comprises a modified acrylic adhesive with a polyester carrier, a polymer, a mylar or polyester mylar substrate with at least one adhesive surface or other known substrate having at least one adhesive surface. The bottom surface of the attachment layer 18 comprises the adhesive used.

In either embodiment, the adhesive employed can not interfere with heat conduction between the strip 10 and the keg 1. The preferred adhesive employed is not permanent whereby the strip 10 may be removed and reused. The adhesive may also comprise the type that permanently attaches the strip 10 to the keg 1. In the preferred embodiment, the adhesive surface of the attachment layer is covered and protected by a thin, pressure sensitive, removable moisture stable release paper 20, such as waxed paper or other known non-permanent adhering paper. Alternatively, the attachment layer may comprise a magnet or magnetized substrate applied to the bottom surface of the attachment layer 18.

In another embodiment, the attachment layer 18 comprises an individual, separate film layover 18'. The film layover 18' preferably covers the strip 10 and extends beyond at least two edges of the strip 10. The film layover 18' comprises a bottom surface which removably adheres to the keg 1 by way of a static charge, surface tension, or adhesives. When an adhesive is used, only the outer edges extending beyond the strip 10 include the adhesive so as to not affect the structural integrity and operation of the strip 10.

To use the instant invention, the release paper 20 is pealed or otherwise removed from the adhesive surface of the attachment layer 18. The strip 10 is then adhered to the exterior surface of the keg 1 in a substantially vertical position between the top and bottom ends of the keg. As beer would prematurely age at room temperature, kegs of beer are invariably stored in refrigerated coolers that are maintained at 30° F. to 50° F. The cooler may comprise a walk-in cooler where kegs are stored prior to use, or the cooler where the keg is kept during use. When attached to the exterior surface of the keg 1, the strip 10 exhibits a color adjacent the portion of the keg having beer 2 and is a different color adjacent the portion of the keg 1 having gas 4, such as $CO_2$ or Nitrous, thus providing an indication of the beer level 3. The liquid crystal composition in layer 14 produces a color which is consistent with or directly related to the temperature of the beer. If the beer is substantially near its ideal temperature (e.g. 38° F.), the strip 10 exhibits a predetermined color, preferably tan/brown or a version of green, which is viewable through the top transparent layer 12. If the beer is within the strip's 10 operative temperature range but below the ideal temperature range T2, then the strip exhibits another color, such as red. If the beer is within the strip's temperature range but above the ideal temperature range T3, then the strip exhibits a third color, such as blue-green or blue. The entire strip remains black when the contents of the keg are outside the strip's temperature bandwidth (T1 and T4) or when there is no beer remaining in the keg 1. The liquid crystals in the inventive strip comprise a composition and makeup that is sensitive to slight fluctuations in temperature within the refrigerated cooler. These temperature fluctuations are caused by the cycling of the cooler motor and the opening and closing of the cooler door. The instant invention discovered a way to take advantage of these cooler temperature fluctuations to activate the liquid crystals without relying on the application of external sources, such as warmed water and heating elements.

The instant invention may employed for any application, similar to that described herein, falling within the 30° F. to 50° F. or 60° F. temperature range. The instant invention may be used to read levels of liquid's other than beer. The strip 10 of the instant invention may come in strips between twelve and twenty-four inches in length and up to two inches in width, or in rolls that may be readily divided in predetermined lengths or lengths pre-provided.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What is claimed is:

1. A liquid level indicator strip for indicating the level of a cooled liquid, as opposed to a gas, in a closed opaque container stored in a cooled environment and containing the cooled liquid and a gas, said strip comprising:
    an elongated top transparent layer having a top surface and a bottom surface;
    an elongated thermochromic liquid crystal layer contiguous with said bottom surface of said top transparent layer and having a first surface and a second surface, said liquid crystal layer comprising a liquid crystal composition having a bandwidth somewhere within 30° F. and 50° F. and that exhibits at least one color when the liquid in said container is detected as having a temperature in said bandwidth, said liquid crystal layer exhibiting said color along said strip adjacent the portion of the container having the liquid and being visible through said top transparent layer said liquid crystal composition comprising means for producing said color absent a warming agent; means for allowing said color to be observed without light interference; and
    means for attaching said strip to the container so as to allow said strip to react to the temperature of the cooled liquid without interfering with the proper operation of said liquid crystal composition.

2. A strip as recited in claim 1, wherein said liquid crystal layer comprises:
    an overall bandwidth somewhere within 32° F. and 44° F., and a first intermediate bandwidth and a second intermediate bandwidth falling within said overall bandwidth; said liquid crystal layer exhibiting a first color in response to a detected temperature falling within said first intermediate bandwidth and a second color in response to a detected temperature falling within said second intermediate bandwidth.

3. A strip as recited in claim 1, wherein said liquid crystal layer exhibits at least two colors when the contents in container are determined to have temperatures somewhere between the bandwidth of 30° F. and 50° F., said liquid crystal composition exhibiting a first color along said strip adjacent the portion of the container having the liquid and exhibiting a second color along said strip adjacent the portion of the container having the gas.

4. A strip as recited in claim 3, wherein said first color comprises:
    one of three colors from a set of three colors, said set of three colors comprising a first predetermined color for indicating that the liquid is at a predetermined ideal temperature, a second predetermined color for indicating that the liquid is below said predetermined ideal temperature and a third predetermined color for indicating that the liquid is above said ideal temperature.

5. A strip as recited in claim 1, wherein said liquid crystal composition causes said liquid crystal layer to exhibit at least two colors when the liquid and gas in said container is determined to have a temperature falling somewhere between 32° F. and 44° F., said liquid crystal layer exhibiting a first color in response to a first predetermined temperature range, said first temperature range falling somewhere between 32° F. and 44° F., said.liquid crystal composition exhibiting a second color in response to a second predetermined temperature range, said second temperature range falling somewhere between 32° F. and 44° F. and outside at least a portion of said first temperature range.

6. A strip as recited in claim 1, wherein said liquid crystal layer comprises:
    a first end and a second, said liquid crystal composition extending continuously substantially between said first and said second end.

7. A strip as recited in claim 1, wherein said liquid crystal layer comprises:
    a first end and a second end and a plurality of individual sections each containing said liquid crystal composition, said plurality of individual sections extending between said first end and said second end.

8. A strip as recited in claim 1, wherein said liquid crystal layer is digital.

9. A strip as recited in claim 1, wherein said liquid crystal layer is analog.

10. A strip as recited in claim 1, wherein said attaching means comprises:
    an elongated adhesive layer having a bottom surface, said bottom surface having an adhesive applied thereto for attaching said strip to the container.

11. A strip as recited in claim 1, wherein said attaching means comprises an adhesive contiguous with said black background, said adhesive removably attaching said strip to the container such that said strip may be removed and reused.

12. A strip as recited in claim 1, wherein said attaching means comprises an adhesive contiguous with said black background, said adhesive permanently attaching said strip to the container.

13. A strip as recited in claim 1, wherein said attaching means comprises:
    an elongated layer having a bottom surface, said bottom surface having a magnetized material for magnetically attaching said strip to the container.

14. A strip as recited in claim 1, wherein said strip comprises:
    a multiple layer elongated strip having a size that fits between the top and bottom of a conventional keg of beer, said strip being between twelve and twenty-four inches long and less than three inches wide and flexible for fitting on and adapting to the shape of the container.

15. A strip as recited in claim 1, wherein said strip comprises:
    a multiple layer elongated strip stored in a roll and being divisible into a plurality of said strips each having a size that fits between the top and bottom of a conventional keg of beer.

16. A beer level indicator strip for indicating the level of a cooled beer, as opposed to a gas, in a closed opaque keg container stored in a cooled environment and containing the cooled beer and gas, said strip comprising:

an elongated top transparent layer having a top surface and a bottom surface;

an elongated thermochromic liquid crystal layer contiguous with said bottom surface of said top transparent layer and having a bottom surface, said liquid crystal layer comprising a liquid crystal composition having a bandwidth somewhere within 34° F. and 42° F., said liquid crystal composition causing said liquid crystal layer to exhibit at least two colors when the beer and gas in said container are determined to have temperatures somewhere within said bandwidth, said liquid crystal layer exhibiting said first color along said strip adjacent the portion of the container having the liquid and exhibiting the second color along said strip adjacent the portion of the container having the gas thereby indicating the level of beer in the keg, said first color and said second color being responsive to different temperature ranges within said bandwidth and visible through said top transparent layer, said liquid crystal composition comprising mean for producing said color absent a warming agent;

a black background contiguous with said bottom surface of said liquid crystal layer for allowing said color to be observed without light interference; and means, contiguous with said black background, for attaching said strip to the container so as to allow said strip to exhibit said colors in response temperatures sensed within said bandwidth without interfering with the proper operation of said liquid crystal composition.

17. A strip as recited in claim 16, wherein said liquid crystal layer comprises:

an overall bandwidth of 36° F. to 42° F., and exhibits a first color when it senses a temperature in a first temperature range corresponding to the temperature of the beer and exhibits a second color when it senses a temperature in a second temperature range corresponding to the temperature of the gas, said first temperature range being within said overall bandwidth, said second temperature range being greater than said first temperature range.

18. A strip as recited in claim 17, wherein said liquid crystal layer comprises:

a first end and a second, said liquid crystal composition extending continuously substantially between said first and said second end.

19. A strip as recited in claim 17, wherein said liquid crystal layer comprises:

a first end and a second and a plurality of individual sections each containing said liquid crystal composition, said plurality of individual sections extending between said first end and said second end.

20. A strip as recited in claim 17, wherein said attaching means comprises:

an elongated adhesive layer having a bottom surface, said bottom surface having an adhesive applied thereto for removably attaching said strip to the container.

* * * * *